(12) United States Patent
Koripelly et al.

(10) Patent No.: US 11,964,924 B2
(45) Date of Patent: Apr. 23, 2024

(54) SPHERICAL UREA-ALDEHYDE CONDENSATE FERTILIZERS

(71) Applicant: SABIC Global Technologies B.V., Bergen op Zoom (NL)

(72) Inventors: Rajamalleswaramma Koripelly, Bangalore (IN); Satish Burla, Bangalore (IN); Radha Achanath, Bangalore (IN); Samik Gupta, Bangalore (IN)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 17/262,171

(22) PCT Filed: Jul. 23, 2019

(86) PCT No.: PCT/IB2019/000869
§ 371 (c)(1),
(2) Date: Jan. 21, 2021

(87) PCT Pub. No.: WO2020/021335
PCT Pub. Date: Jan. 30, 2020

(65) Prior Publication Data
US 2021/0269372 A1 Sep. 2, 2021

Related U.S. Application Data

(60) Provisional application No. 62/701,987, filed on Jul. 23, 2018.

(51) Int. Cl.
C05C 9/02 (2006.01)
C05G 3/30 (2020.01)
C05G 5/12 (2020.01)

(52) U.S. Cl.
CPC .................. *C05C 9/02* (2013.01); *C05G 3/30* (2020.02); *C05G 5/12* (2020.02)

(58) Field of Classification Search
CPC ................. C05C 9/02; C05G 3/30; C05G 5/12
See application file for complete search history.

(56) References Cited

U.S. PATENT DOCUMENTS 3,322,528 A 5/1967 Hamamoto
3,326,665 A 6/1967 Schafer et al.
(Continued)

FOREIGN PATENT DOCUMENTS

CN 1194633 A 9/1998
CN 1196339 A 10/1998
(Continued)

OTHER PUBLICATIONS

Sushma Lute, Ranjit Dhenge, and Agba Salman, Twin Screw Granulation: An Investigation of the Effect of Barrel Fill Level, Pharmaceutics, Jun. 1, 2018 (Year: 2018).*
(Continued)

*Primary Examiner* — Jennifer A Smith
(74) *Attorney, Agent, or Firm* — Norton Rose Fulbright US LLP

(57) ABSTRACT

Fertilizers that contain urea-aldehyde condensates. The fertilizer can be spherical and can be formed using a granulation and/or spheronization technique and optionally can be an extruded fertilizer that is spheronized.

13 Claims, 3 Drawing Sheets

(56) References Cited

U.S. PATENT DOCUMENTS

| | | | |
|---|---|---|---|
| 3,441,539 A | 4/1969 | Schafer et al. | |
| 3,459,528 A | 8/1969 | Wiesboeck et al. | |
| 3,585,019 A | 6/1971 | Hays | |
| 3,870,755 A | 3/1975 | Kamo et al. | |
| 3,962,329 A | 6/1976 | Schoenaich et al. | |
| 3,961,329 A | 7/1976 | Naidich | |
| 4,062,890 A | 12/1977 | Shank | |
| 4,089,899 A | 5/1978 | Greidinger et al. | |
| 4,102,840 A | 7/1978 | Pusch | |
| 4,243,797 A | 1/1981 | Peterson et al. | |
| 4,298,512 A | 11/1981 | Sartoretto et al. | |
| 4,304,588 A * | 12/1981 | Moore, Jr. | C05C 9/02 564/3 |
| 4,411,683 A | 10/1983 | Goertz | |
| 4,599,102 A | 7/1986 | Hawkins | |
| 5,039,328 A | 8/1991 | Saitoh et al. | |
| 5,124,451 A | 7/1992 | Hackl et al. | |
| 5,169,954 A | 12/1992 | Hackl et al. | |
| 5,414,083 A | 5/1995 | Hackl et al. | |
| 5,597,917 A | 1/1997 | Hackl et al. | |
| 6,306,194 B1 | 10/2001 | Wertz et al. | |
| 7,468,087 B2 * | 12/2008 | Sakamoto | C05F 17/00 71/28 |
| 9,340,495 B2 | 5/2016 | Hashmi et al. | |
| 2003/0154754 A1 | 8/2003 | Costa et al. | |
| 2009/0165515 A1 | 7/2009 | Hiroshi et al. | |
| 2014/0047884 A1 | 2/2014 | Gabrielson et al. | |
| 2015/0101379 A1 | 4/2015 | Gabrielson et al. | |
| 2015/0183729 A1 | 7/2015 | Hashmi et al. | |
| 2016/0060182 A1 | 3/2016 | Cook | |
| 2016/0340265 A1 | 11/2016 | Kanagalingam et al. | |

FOREIGN PATENT DOCUMENTS

| | | |
|---|---|---|
| CN | 101041593 | 9/2007 |
| CN | 101759481 | 6/2010 |
| CN | 103011982 | 4/2013 |
| CN | 104812723 | 7/2018 |
| DE | 1146080 | 3/1963 |
| DE | 1543201 | 6/1970 |
| DE | 1905834 | 11/1972 |
| DE | 142044 | 6/1980 |
| DE | 4128828 | 3/1993 |
| DE | 19631764 | 2/1998 |
| EP | 0877722 | 11/1998 |
| EP | 1170272 | 1/2002 |
| EP | 1174402 | 1/2002 |
| EP | 1288179 | 3/2003 |
| EP | 1724247 | 11/2006 |
| EP | 1213275 | 6/2022 |
| GB | 949408 | 2/1964 |
| GB | 1099643 | 1/1968 |
| GB | 1212605 | 11/1970 |
| WO | WO 2014/016745 | 1/2014 |
| WO | WO 2015/114542 | 8/2015 |
| WO | WO 2017/013573 | 1/2017 |
| WO | WO2018/197991 | 11/2018 |

OTHER PUBLICATIONS

Incitec Pivot Fertilisers, Product Density and Sizing, Jul. 2016 (Year: 2016).*

Brenda Novoa-Martinez, Strength properties of granules materials, LSU Master's Theses, 2003 (Year: 2003).*

Fulton, John, and Kaylee Port. "Physical properties of granular fertilizers and impact on spreading." Ohio State University, FABE-550.1 (2016). (Year: 2016).*

Ando, et al. "Plant Nutrition For Sustainable Food Production and Environment," *Proceedings of the XIII International Plant Nutrition Colloquium*, 1997, 13-19:639-640.

Bose, et al. "New protocol for Biginelli reaction-a practical synthesis of Monastrol," *ARKIVOC*, 2005, 3:228-236.

European Search Report for Application No. 12005353.3, dated Nov. 28, 2012.

Gautney, et al. "Feasibility of cogranulating the nitrogen loss inhibitors dicyandiamide, thiourea, phenyl phosphorodiamidate, and potassium ethyl xanthate with urea," *Ind. Eng. Chem. Prod. Res. Dev.*, 1984, 23:483-489.

International Search Report and Written Opinion issued in International Patent Application No. PCT/IB2018/052635, dated Jul. 9, 2018.

International Search Report and Written Opinion issued in International Patent Application No. PCT/IB2019/000869, dated Jan. 8, 2020.

International Search Report issued in International Patent Application No. PCT/IB2018/055928, dated Oct. 28, 2013.

Jahns, et al. "Biodegradability of Urea-Aldehyde Condensation Products," Journal of Polymers and the Environment, 2003, 11(4):155-159.

Lunt, et al. "Properties and Value of 1,1-Diureido Isobutane (IBDU) as a Long-Lasting Nitrogen Fertilizer," J. Agr. Food Chem., 1969, 17(6):1269-1271.

Mobinikhaledi et al. "Synthesis of Some 2-Oxo and 2-Thioxo Substituted Pyrimidines Using Solvent-free Conditions," Journal of Heterocyclic Chemistry, 2007, 44:697-699.

Office Action issued in corresponding Australian Patent Application No. 2013294659, dated Jun. 10, 2015.

Office Action issued in corresponding Chinese Patent Application No. 201380039066.5, dated Sep. 17, 2015. (Machine Translation Provided).

Office Action issued in corresponding Indian Patent Application No. 10324/DELNP/2014, dated Jan. 15, 2018.

Office Action issued in corresponding Taiwanese Patent Application No. 102126107, dated Jul. 15, 2016.

Reddy, et al. New environmentally friendly solvent free synthesis of dihydropyrimidinones catalysed by N-butyl-N, N-dimethyl-phenylethylammonium bromide, *Tetrahedron Letters*, 2003, 44:8173-8175.

Watson, et al. "Rate and mode of application of the urease inhibitor N-(n-butyl) thiophosphoric triamide on ammonia volatilization from surface-applied urea," *Soil Use and Management*, 2008, 24:246-253.

Wirtz, et al. "Ethanolamines and Propanolamines to Fiber, 4 Synthetic Organic;" *Ullmann's Encyclopedia of Industrial Chemistry*, 1987; 5, (10):363-401.

Office Action Search Report issued in corresponding Chinese Patent Application No. 201880034214.7, dated Nov. 23, 2021.

McVey, GR. "Methylene Urea—A Controlled Release Nitrogen Source for Turfgrass" 0. M. Soctt & Sons Company pp. 60-72 (1979) (Year: 1979).

* cited by examiner

SPHERICAL UREA-ALDEHYDE CONDENSATE FERTILIZERS

CROSS REFERENCE TO RELATED APPLICATIONS

This application is a national phase application under 35 U.S.C. § 371 of International Application No. PCT/IB2019/000869, filed Jul. 23, 2019, which claims the benefit of priority to U.S. Provisional Patent Application No. 62/701,987 filed Jul. 23, 2018, the entire contents of each of which are hereby incorporated by reference in their entirety.

BACKGROUND OF THE INVENTION

A. Field of the Invention

The invention generally concerns a fertilizer that includes urea-aldehyde condensates. The fertilizer can be spherical and can be formed using granulation (e.g., pan and/or drum granulation) or a spheronization technique and optionally can be an extruded fertilizer that is spheronized.

B. Description of Related Art

To increase crop yield and satisfy the growing needs of an increasing population, more fertilizers are being used in agriculture. Fertilizers containing nitrogen are used to support healthy plant growth and photosynthesis. Urea ($CH_4N_2O$) is a compound that contains nitrogen and is widely used as a nitrogen source in fertilizers. However, due to its rapid hydrolysis and nitrification in the soil by soil bacteria, nitrogen from urea can be quickly lost.

Urea-aldehyde condensates have been employed as a solution to the problem of rapid loss of nitrogen from urea. Short chain urea-aldehyde condensates and polymers are especially valuable for use in fertilizers because of their water soluble nitrogen content. However, there are certain difficulties in using these condensates. For example, granular slow release fertilizer products are generally found to have physical and chemical property shortcomings, such as poor hardness. Similarly, slow release fertilizers, such as isobutylidenediurea (IBDU), when granulated also result in granules with poor hardness (e.g., crushing strength of 0.8 kgf/granule or less). These granules can have poor nutrient use efficiency as they easily disintegrate into powder and readily decompose to inorganic nitrogen (see Plant nutrition for sustainable food production and environment, 639-640, 1997). Further, urea-aldehyde condensate granular products have limitations in bulk blending fertilizers, mainly due to low granule hardness and small granule size (US 2009/0165515). Accordingly, slow release fertilizers, such as urea-aldehyde condensates, can be fragile and dusty. These problems limited their use in agricultural applications and in bulk blending fertilizers.

Some have attempted to remedy these problems by combining slow release fertilizers with binders (Plant nutrition for sustainable food production and environment, 639-640, 1997; US 2009/0165515; U.S. Pat. No. 5,039,328; WO 2017/013573; US 2016/0340265; US 2016/0060182; and EP 1174402). However, the added binders may not provide nutritive value to the fertilizer, may add costs and/or complexity to production, and may undesirably increase the weight and volume of the fertilizer. Some have tried to control a catalytic or chemical reaction to produces fertilizer granules of a certain size that have a desired crush strength (US 2003/0154754). However, these processes are complex and a large portion of the material coming out of the reaction vessel is unacceptable for use as a fertilizer and needs to be reintroduced to the production process. These processes add additional complexity, may produce only low yields of product that do not require reintroduction, and adds to the costs of production.

Therefore, there is a need to develop slow release fertilizers with improved physical characteristics and processes to develop said fertilizers.

SUMMARY OF THE INVENTION

The inventors have discovered a solution to at least some of the aforementioned problems associated with slow release fertilizers. The solution resides in providing a fertilizer, such as urea-aldehyde condensates, in spherical shape. The spherical urea-aldehyde condensate fertilizers of the present invention have improved hardness and use efficiency. These fertilizers also have a resistance against turning to powder. These properties allow the fertilizers of the present invention to be combined with other fertilizers or fertilizer ingredients to form a blended fertilizer composition. The blending can occur after the spherical fertilizer granules are formed. In this way, the spherical fertilizer granules can be added to other fertilizers to produce a custom fertilizer blend and/or a product to fit fertilizer needs for particular applications. These properties also allow for increased nutrient delivery and slower nutrient release.

The fertilizers of the present invention can be formed into a sphere by a granulation (e.g., pan and/or drum granulation) or spheronization technique. The spheronization technique can include use of a spheronizer and can further include extruding the fertilizer before use of a spheronizer. The granulation or spheronization can be performed after the chemical reactions that produce the fertilizer components have been completed and before or after drying of the fertilizer. An additional advantage of spheronization is that the spheronization process can produce granules of a consistent size, and that may also reduce the need to recycle granules that do not meet the size requirements. This reduced recycling can result in a more economically efficient process that can be commercially scalable.

In some aspects of the present invention, there is disclosed a spherical urea-C1-C4 aldehyde condensate granule. In some preferred instances, the spherical urea aldehyde condensate granule is a C2-C4 aldehyde condensate granule. In some preferred instances, the spherical urea aldehyde condensate granule is a C1 aldehyde condensate and C4 aldehyde condensate mixture. In some preferred instances, the spherical urea aldehyde condensate granule is a C1 aldehyde and C4 aldehyde condensate mixture. The granule can be of any size. In some instances, the granule has an average diameter of 1 mm to 4 mm, 1 mm to 3.5 mm, 1 mm to 3 mm, 1.5 mm to 2.5 mm, 2 mm to 3.5 mm, or any range therein, including 0.5, 1, 1.5, 2, 2.5, 3.0, 3.5, 4 mm and any ranges or subranges therein. In some instances, the granule can have a crush strength greater than a non-spherical urea-C1-C4 aldehyde condensate granule. In some instances, the average crush strength is greater than 1.3 kgf/granule, greater than 1.6 kgf/granule, greater than 1.8 kgf/granule, greater than 1.9 kgf/granule, greater than 2.0 kgf/granule, 1.3 kgf/granule to 3.5 kgf/granule, 1.6 kgf/granule to 4 kgf/granule, 1.6 kgf/granule to 3.5 kgf/granule, 1.8 kgf/granule to 3.5 kgf/granule, 1.9 kgf/granule to 3.5 kgf/granule, or any range therein. In some instances, the average crush strength is 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5 kgf/granule or more, including all ranges and subranges there between.

The C1-C4 aldehydes of the spherical urea-aldehyde condensate can be any C1-C4 aldehyde, derivative thereof, or combination thereof. In some instances, the C1-C4 aldehydes can be formaldehyde, butyraldehyde, isobutyraldehyde, crotonaldehyde, or any combination thereof. The formaldehyde can be in a variety of forms such as its aldehyde form ($CH_2O$), its hydrated form (methanediol), and its paraformaldehyde form. In some particular instances, the formaldehyde can be urea formaldehyde concentrate-85 or formalin comprising 37-65% formaldehyde. In some instances, the urea-aldehyde condensate includes at least one isobutylidenediurea derivative and at least one methylene urea oligomer. In some instances, the urea-aldehyde condensate includes methylene urea-isobutylidenediurea (MU-IBDU), or a derivative thereof. In some instances, the urea-aldehyde condensate includes isobutylidenediurea, mono (ureidomethylene) isobutylenediurea, bis(ureidomethylene) isobutylenediurea, and at least two, three, or all four methylene urea oligomers selected from the group consisting of methylene diurea, dimethylene triurea, trimethylene tetraurea, and tetramethylene pentaurea. In some preferred instances, C2-C4 aldehydes are used.

The spherical urea-aldehyde condensate granule can contain only a urea-aldehyde condensate, or can contain one or more additional ingredients. Additional ingredients that can be contained in the granule include flow promotors, binders, pH adjusters or buffers, or combinations thereof. In some instances, the granule does not contain flow promotors, binders, or pH adjusters or buffers. The additional ingredients can be combined into the granule when the urea-aldehyde condensate is mixed with water to form a mixture. The granule can contain any amount of additional ingredients, such as 0.001 wt. % to 10 wt. %, 0.001 wt. % to 9 wt. %, 0.001 wt. % to 8 wt. %, 0.001 wt. % to 7 wt. %, 0.01 wt. % to 10 wt. %, 0.01 wt. % to 9 wt. %, 0.01 wt. % to 8 wt. %, 0.01 wt. % to 7 wt. %, or any range or value therein. In some instances, the granule can contain 0.001, 0.002, 0.003, 0.004, 0.005, 0.006, 0.008, 0.009, 0.01, 0.02, 0.03, 0.04, 0.05, 0.06, 0.07, 0.08, 0.09, 0.1, 0.2, 0.3, 0.4, 0.5, 0.7, 0.8, 0.9, 1, 2, 3, 4, 5, 6, 7, 8, 9, or 10 wt. % of additional ingredients. In some instances, the flow promotor in the granule is, or is not, one or more of bleached wheat flour, microcrystalline silica, chitosan, natural gums such as agar, gaur gum, clays such as bentonite, cellulose derivatives such as carboxy methyl cellulose, methyl cellulose, ethyl cellulose, hydroxyl ethyl cellulose, and hydroxypropyl methylcellulose (HPMC). In some instances, the binder is, or is not, one or more of bleached wheat flour, gaur gum, calcium ligno sulfonate, gelatin, seaweed extract, plaster of paris, flour, starch, cellulose, gluten, colloidal silica, kaolin, bentonite, poly ethylene glycol (PEG), polycaprolactone, low molecular weight poly vinyl acetate, and/or 60 wt. % urea solution. In some instances, the granule does not contain tetrahydrate calcium nitrate, or contains less than 0.4 wt. % tetrahydrate calcium nitrate.

The spherical urea-aldehyde condensate or one or more chemicals therein can be formulated into a fertilizer. In some instances, the condensate is formulated into a slow-release fertilizer. In some instances, the condensate is formulated into a specialty fertilizer. The processes disclosed herein may further comprise the step of mixing the condensate or one or more chemicals therein with another fertilizer, secondary nutrient, trace element, plant protection agent, filler, and/or with other fertilizer ingredients to form a mixed fertilizer.

In some aspects of the present invention, there is disclosed a fertilizer composition. The fertilizer composition can contain a plurality of the spherical urea-aldehyde condensate fertilizer granules of the present invention. In certain instances, the fertilizer composition can also be a mixture of a non-urea-aldehyde condensate fertilizer and a plurality of the spherical urea-aldehyde condensate fertilizer granules disclosed herein. The fertilizer composition can contain any concentration of the spherical urea-aldehyde condensate fertilizers. The spherical urea-aldehyde condensate fertilizers can be the source of the entire amount of the nitrogen in the fertilizer composition.

Also disclosed in the context of the present invention are processes and methods for making and/or using a spherical urea-aldehyde condensate and fertilizer compositions disclosed herein. A spherical granule can be produced by combining a urea-aldehyde condensate and water to form a mixture; optionally extruding the mixture; forming spheres from the mixture or extrudate; and drying the spheres to form the spherical urea-aldehyde condensate granule. In some instances, the mixture contains 10 wt. % to 40 wt. % water, 10 wt. % to 30 wt. % water, 10 wt. % to 20 wt. % water, 15 wt. % to 40 wt. % water, 15 wt. % to 30 wt. % water, 15 wt. % to 20 wt. % water, 20 wt. % to 40 wt. % water, 20 wt. % to 30 wt. % water, 30 wt. % to 40 wt. % water, or any value or range therein. In some instances, the mixture contains 10, 15, 20, 25, 30, 35, or 40 wt. % water.

In some instances, the urea-aldehyde condensate is first extruded before being formed into a sphere. Temperatures of the extrusion can be higher than the melting point of one or more binder used in the spherical urea-aldehyde condensate fertilizer. The temperature can be lower than a temperature in which the fertilizers therein degrade. The temperature can be lower than the melting temperature of urea-aldehyde condensate or urea. In some instances, the extrusion temperature can be less than 50° C., less than 40° C., less than ° C., preferably 20° C. to 50° C., 20° C. to 40° C., more preferably 20° C. to 35° C.

The extrusion process can be carried out in any extruder. In some instances, the extruder is a single screw extruder, double extruder, triple or more extruder. In some instances, the extruder is capable of rotating at an rpm of 20 to 300, preferably about 40 to 200, more preferably about 60 to 120. In some instances, the pressure at the extruder is 1 bar to 50 bar, preferably 15 to 45 bar, more preferably 25 bar to 35 bar.

The extruded urea-aldehyde condensate can be cut or passed through a die before forming a sphere. In some instances, the die can be perforated.

In some instances, the urea-aldehyde condensate granule is formed into a sphere by a spheronization process. The process can include use of a spheronizer. The process can be carried out in any spheronizer. In some instances, the spheronizer is a disc spheronizer. In some instances, the disc is operated at a disc speed of greater than 1000 RPM, greater than 1500 RPM, 1500 RPM to 5000 RPM, 1500 RPM to 3500 RPM, 2000 RPM to 3000 RPM or any range therein. In some instances, the spheronizer is operated with the air flow having a pressure of 0.1 bar to 10 bar, 0.5 bar to 10 bar, 0.5 bar to 2 bar, 0.5 bar to 1 bar, 0.1 bar to 3 bar, 0.1 bar to 2 bar, 0.1 bar to 1 bar, 0.3 bar to 0.7 bar, or any range therein. The spheronization process can be performed for any amount of time, such as 1 to 15 minutes, 1 to 10 minutes, 2 to 15 minutes, 2 to 10 minutes, or any range therein.

In some instances, the urea-aldehyde condensate granule is formed into a sphere by a granulation (e.g., pan and/or drum granulation) technique or granulation combined with a spheronization technique, such as use of a spheronizer. The granulation can be carried out in any suitable granulator. In some instances, the granulation is carried out using powdered urea-aldehyde condensate(s) and water. In some instances, the granulator is operated at a rotation speed of less than 500 RPM, less than 400 RPM, less than 300 RPM, less than 200 RPM, less than 100 RPM, less than 90 RPM, less than 80 RPM, less than 70 RPM, less than 60 RPM, less than 50 RPM, less than 40 RPM, less than 30 RPM, less than 20 RPM, less than 10 RPM, or any range or RPM therein or there between. In some instances, the granulator is operated with the air flow having a pressure of 0.1 bar to 10 bar, 0.5 bar to 10 bar, 0.5 bar to 2 bar, 0.5 bar to 1 bar, 0.1 bar to 3 bar, 0.1 bar to 2 bar, 0.1 bar to 1 bar, 0.3 bar to 0.7 bar, or any range therein and a temperature of 40° C., 50° C., 60° C., 70° C., 80° C., 90° C., 100° C. or any temperature or range therein or there between. The granulation process can be performed for any amount of time, such as 1 to 15 minutes, 1 to 10 minutes, 2 to 15 minutes, 2 to 10 minutes, or any range or time therein or there between.

In some instances, the granules are dried before, during, and/or after spheronization and/or granulation. In some instances, the granules can be dried to have a moisture content of less than 1 wt. %, less than 0.9 wt. %, less than 0.8 wt. %, less than 0.7 wt. %, less than 0.6 wt. %, less than 0.5 wt. %, less than 0.4 wt. %, less than 0.3 wt. %, less than 0.2 wt. %, less than 0.1 wt. %, or 0 wt. %, or any range or amount thereof or there between. The granules can be dried at 40° C., 50° C., 60° C., 70° C., 80° C., 90° C., or 100° C., or any temperature or range thereof or there between.

The process can further include combining the spherical urea-aldehyde condensate fertilizers with a non-urea-aldehyde condensate fertilizer to form a blended fertilizer. In some instances, the non-urea-aldehyde condensate fertilizers are not bound in, by, or with a spherical urea-aldehyde condensate fertilizers. The spherical urea-aldehyde condensate fertilizers and non-urea-aldehyde condensate fertilizer can be combined at any ratio. In some instances, no non-urea-aldehyde condensate fertilizers are combined with the spherical urea-aldehyde condensate fertilizers. In some instances, the blended fertilizer contains spherical urea-aldehyde condensate fertilizers and non-urea-aldehyde condensate fertilizers at a ratio of 1:100 to 100:1, preferably 1:10 to 10:1, more preferably 1:4 to 4:1, or any range therein.

The spherical urea-aldehyde condensate fertilizers of the present invention, the fertilizer compositions of the present invention, and the fertilizer compositions produced by the processes of the present invention can be used to fertilize by applying to at least one of a soil, a carrier for an organism, and/or an organism. In some instances, the spherical urea-aldehyde condensate fertilizers of the present invention, the fertilizer compositions of the present invention, and the fertilizer compositions produced by the processes of the present invention are combined with a liquid carrier, a liquid solvent, or a combination thereof before being applied to the soil, the carrier for an organism, and or the organism.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea-aldehyde condensates of the present invention, urea, ammonium nitrate, calcium ammonium nitrate, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to biostimulants.

The following includes definitions of various terms and phrases used throughout this specification.

A "C1-C4 aldehyde" and/or "C2-C4 aldehyde" can be a straight or branched aldehyde, saturated or unsaturated aldehyde, a substituted aldehyde, etc. having 1 to 4 carbon atoms or 2 to 4 carbon atoms, respectively. Non-limiting examples include formaldehyde, acetaldehyde, propionaldehyde, butyraldehyde, isobutyraldehyde, and crotonaldehyde. In some particular, instances, C2-C4 aldehydes are used to produce the urea aldehyde condensates of the present invention.

The term "short chain" methyleneureas can include methyleneureas containing one to five urea units.

The term "granule" can include a solid material. A granule can have a variety of different shapes, non-limiting examples of which include a spherical, a puck, an oval, a rod, an oblong, or a random shape. The terms "granule" and "particle" are interchangeable in this application.

The terms "particulate" or "powder" can include a plurality of particles.

The term "biodegradable" is defined as capable of being degraded by naturally occurring living organisms or through natural environmental conditions such as exposure to water, rain, sunlight, heat, cold, etc. Naturally occurring living organisms can include bacteria, fungus, plants, insects, animals, mammals, and/or humans.

The term "reducing" or any variation of this term, includes any measurable decrease or complete reduction to achieve a desired result.

The term "effective," or any variation of this term, means adequate to accomplish a desired, expected, or intended result.

The terms "about," "approximately," and "substantially" are defined as being close to, as understood by one of ordinary skill in the art. In one non-limiting instance, the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component. In a non-limiting example, 10 grams of a component in 100 grams of the material that includes the component is 10 wt. % of component.

The use of the words "a" or "an" when used in conjunction with any of the terms "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The process and compositions of the present invention can "comprise," "consist essentially of," or "consist of" particular ingredients, components, compositions, etc., disclosed throughout the specification. With respect to the transitional phase "consisting essentially of," in one non-limiting aspect, a basic and novel characteristic of the spherical urea-aldehyde condensate granules of the present invention is the spherical shape of these granules and their improved crush strength.

Other objects, features, and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes, combinations, and modifications within the spirit and scope of the invention will become apparent to those skilled in the art from this detailed description.

BRIEF DESCRIPTION OF THE DRAWINGS

Advantages of the present invention may become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

Figure 1:
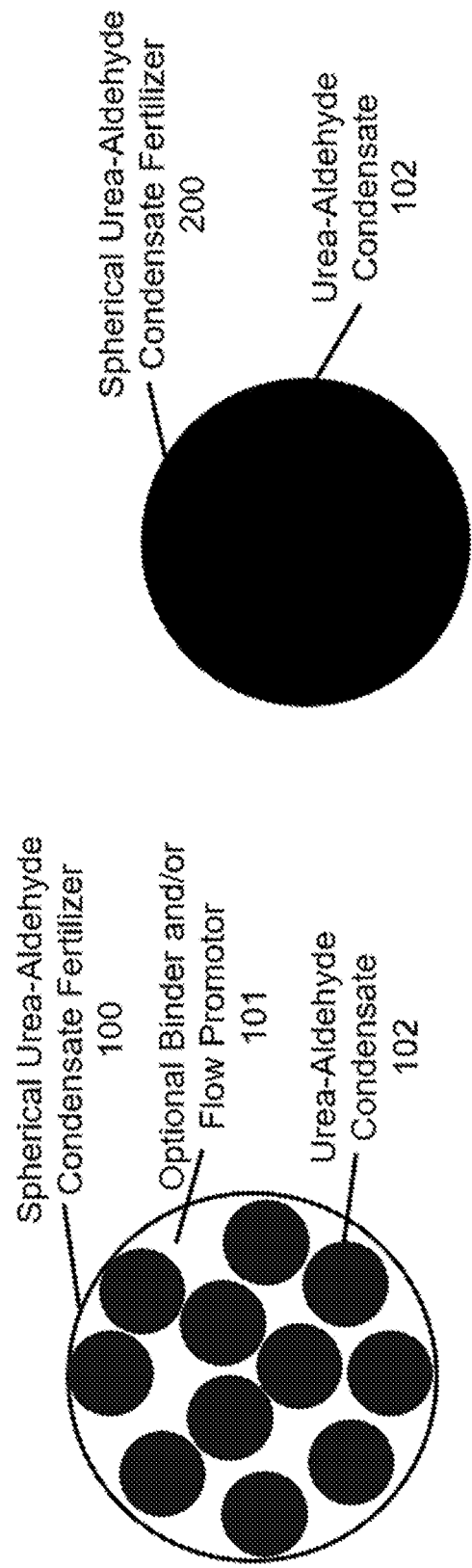
FIG. 1 illustrates a non-limiting representations of spherical urea-aldehyde condensate fertilizer embodiments.

While the invention is susceptible to various modifications and alternative forms, specific embodiments thereof are shown by way of example in the drawings and may herein be described in detail. The drawings may not be to scale.

DETAILED DESCRIPTION OF THE INVENTION

The spherical urea-aldehyde condensate fertilizer of the present invention provide an elegant solution to at least some of the problems associated with urea-aldehyde condensate fertilizers. The spherical urea-aldehyde condensate fertilizers can be formed as a sphere through granulation and/or spheronization and optionally can be extruded before spheronization. The granulation and/or spheronization can be performed after the chemical reactions that produce the urea-aldehyde condensate have been completed. The presence of an optional binder and/or flow promotor in the spherical urea-aldehyde condensate fertilizer can improve the production of the spherical urea-aldehyde condensate fertilizer. The spherical urea-aldehyde condensate fertilizers can have a consistent size. The blended fertilizers of the present invention can contain a plurality of the spherical urea-aldehyde condensate fertilizers in combination with other fertilizers or fertilizer ingredients.

These and other non-limiting aspects of the present invention are discussed in further detail in the following sections.

A. Spherical Urea-Aldehyde Condensate Fertilizer

Illustrative cross section views of embodiments of a spherical urea-aldehyde condensate fertilizer of the present invention are depicted symbolically in FIG. 1. In the illustrated embodiment, the spherical urea-aldehyde condensate fertilizer 100 comprises an optional binder and/or flow promotor 101, and urea-aldehyde condensate 102. The spherical urea-aldehyde condensate fertilizer 200 comprises urea-aldehyde condensate 102. The spherical urea-aldehyde condensate fertilizer 100 and 200 have a circular cross-section. The spherical urea-aldehyde condensate fertilizer 100 and 200 may also comprise other ingredients, such as micronutrients, pH balancing agents, and/or thickeners, etc. In the illustration, and for illustrational purposes only, urea-aldehyde condensate 102 has a filled in circular cross section. The shapes, sizes, and relative numbers of the components in the illustration are used to assist in easily distinguishing the different components in the spherical urea-aldehyde condensate fertilizer 100 and 200 and are non-limiting. Other sizes and relative numbers of components are contemplated and can readily be made. In the illustrated spherical urea-aldehyde condensate fertilizer 100 embodiment, in certain aspects of the present invention, the binder and/or flow promotor 101 can act as a continuous phase that helps bind the urea-aldehyde condensate 102 and binder and/or flow promotor 101 together to form the spherical urea-aldehyde condensate fertilizer 100. In certain aspects no binder and/or flow promotor 101 is contained in the spherical urea-aldehyde condensate fertilizer 200. It will be apparent to persons of ordinary skill in the art that other configurations of the spherical urea-aldehyde condensate fertilizer 100 and 200 are possible. Although FIG. 1 represents a perfectly spherically-shaped fertilizer, it is contemplated in the context of the present invention that the spherically-shaped fertilizers can include substantially spherically-shaped fertilizers. Substantially spherical can include ellipsoidal shapes. Substantially spherical can include a ratio of the lengths across perpendicular axis of the particle cross-section including a ratio falling within the range of a ratio of 0.5 to a ratio of 2.0, preferably falling within a range of a ratio of 0.8 to a ratio of 1.2, more preferably falling within a range of a ratio of 0.9 to a ratio of 1.1, or having a ratio of about 1.0.

The spherical urea-aldehyde condensate fertilizer 100 and 200 can have a variety of sizes. In some embodiments, the spherical urea-aldehyde condensate fertilizer can have an average mean diameter between about 1 and 8 mm, 1 and 4 mm, or 2 and 3.5 mm, or any size therein.

B. Urea-Aldehyde Condensate

The urea-aldehyde condensate contains a C1-C4/urea oligomer. In some instances, the urea-aldehyde condensate contains a C2-C4/urea oligomer. In some instances the urea-aldehyde condensation contains a mixture of C1 and C4 aldehydes. The C1-C4 or C2-C4/urea oligomer can be any C1-C4 or C2-C4/urea oligomer. The C1-C4 and C2-C4 aldehydes of the spherical urea-aldehyde condensate can be any C1-C4 or C2-C4 aldehyde, derivative thereof, or combination thereof. In some instances, the C1-C4 or C2-C4 aldehydes can be formaldehyde, butyraldehyde, isobutyraldehyde, crotonaldehyde, or any combination thereof. In some instances, the condensates contain less than 25, 20, 15, 10, 5, 4, 3, 2, or 1 wt. % urea.

C. Binders and Flow Promotors

Binders can be used to bind together components in a mixture through adhesive and/or cohesive forces. The binder to be used in the spherical urea-aldehyde condensate fertilizer may be chosen for suitability in the granulation and/or spheronization or extrusion processes for making the spherical urea-aldehyde condensate fertilizer. Binders can be polymeric or non-polymeric binders. The binder can have a melting point or softening temperature below the temperature that the urea-aldehyde condensate contained in the spherical urea-aldehyde condensate fertilizer degrades or melts. In non-limiting examples, this temperature is below 50° C., below 40° C., below 30° C., below 20° C., or any temperature therein. In some instances, the binders are biodegradable. In some instances the binders are water soluble.

Non-limiting examples of binders include bleached wheat flour, gaur gum, calcium ligno sulfonate, gelatin, seaweed extract, plaster of paris, flour, starch, cellulose, gluten, colloidal silica, kaolin, bentonite, poly ethylene glycol (PEG), polycaprolactone, low molecular weight poly vinyl acetate, 60 wt. % urea solution, polyacrylamide, polyacrylic acid, polyacrylonitrile, hydroxypropyl methylcellulose (HPMC), biodegradable polylactic acid, and other biodegradable polymeric material such as polylactic acid, poly (3-hydroxypropionic acid), polyvinyl alcohol, poly e-caprolactone, poly L-lactide, poly butylene succinate, and biodegradable starch based polymers.

Flow promoters can be used to increase the flow of a urea-aldehyde condensate or increase the ability to granulate and/or spheronize the urea-aldehyde condensate. The flow promotor to be used in the spherical urea-aldehyde condensate fertilizer may be chosen for suitability in the granulation and/or spheronization or extrusion processes for making the spherical urea-aldehyde condensate fertilizer. Flow promotors can be polymeric or non-polymeric.

Non-limiting examples of flow promotors include bleached wheat flour, microcrystalline silica, chitosan, natural gums such as agar, gaur gum, clays such as bentonite, cellulose derivatives such as carboxy methyl cellulose, methyl cellulose, ethyl cellulose, hydroxyl ethyl cellulose, and hydroxypropyl methylcellulose (HPMC).

The spherical urea-aldehyde condensate fertilizer can contain any amount of binder and/or flow promotor. The spherical urea-aldehyde condensate fertilizer can have a sufficient amount of a binder to bind together the spherical fertilizer or an extrudate used to create the spherical fertilizer. The spherical urea-aldehyde condensate fertilizer can have a sufficient amount of a flow promotor to increase the flow of a urea-aldehyde condensate through an extruder. The concentration of the binder and/or flow promotor can be 10, 9, 8, 7, 6, 5, 4, 3, 2, 1, 0.9, 0.8, 0.7, 0.6, 0.5, 0.4, 0.3, 0.2, 0.1 wt. %, or any concentration or range therein based on the total weight of the spherical urea-aldehyde condensate fertilizer. In preferred embodiments, the spherical urea-aldehyde condensate fertilizer contains 0.2 wt. % to 5 wt. %, more preferably 0.5 wt. % to 1 wt. %, or any value or range therein, of the binder and/or flow promotor. In some instances, no binder and/or flow promotor is used in the spherical urea-aldehyde condensate fertilizer.

Spherical urea-aldehyde condensate fertilizers of the present invention can have desirable physical properties such as desired levels of abrasion resistance, strength, pelletizability, hygroscopicity, shape, and/or size distribution. Accordingly, the binder and/or flow promotor may be chosen to optimize these properties.

D. Additional Fertilizers

Additional fertilizer substances besides urea-aldehyde condensate may be included in the spherical urea-aldehyde condensate fertilizer or used in a fertilizer composition or blend of the present invention. Additional fertilizers can be chosen based on the particular needs of certain types of soil, climate, or other growing conditions to maximize the efficacy of the spherical urea-aldehyde condensate fertilizer in enhancing plant growth and crop yield. Additional additives may also be included in the spherical urea-aldehyde condensate fertilizer or used in a fertilizer composition or blend of the present invention, including without limitation micronutrients, primary nutrients, and secondary nutrients. A micronutrient can be a botanically acceptable form of an inorganic or organometallic compound such as boron, copper, iron, chloride, manganese, molybdenum, nickel, or zinc. A primary nutrient can be a material that can deliver nitrogen, phosphorous, and/or potassium to a plant. Nitrogen-containing primary nutrients may include urea, ammonium nitrate, ammonium sulfate, diammonium phosphate, monoammonium phosphate, urea-formaldehyde, or combinations thereof. A secondary nutrient can be a substance that can deliver calcium, magnesium, and/or sulfur to a plant. Secondary nutrients may include lime, gypsum, superphosphate, or a combination thereof.

E. pH Buffering Agents

The spherical urea-aldehyde condensate fertilizer of the present invention may also contain one or more pH buffering agents. Examples of suitable pH buffering agents include, but are not limited to, $CaCO_3$, $MgO$, $KH_2PO_4$, $NaHCO_3$, chalk powder, aluminum, magnesium hydroxide, aluminum hydroxide, sodium bicarbonate etc. and combinations thereof.

F. Blended Fertilizer

Figure 3:
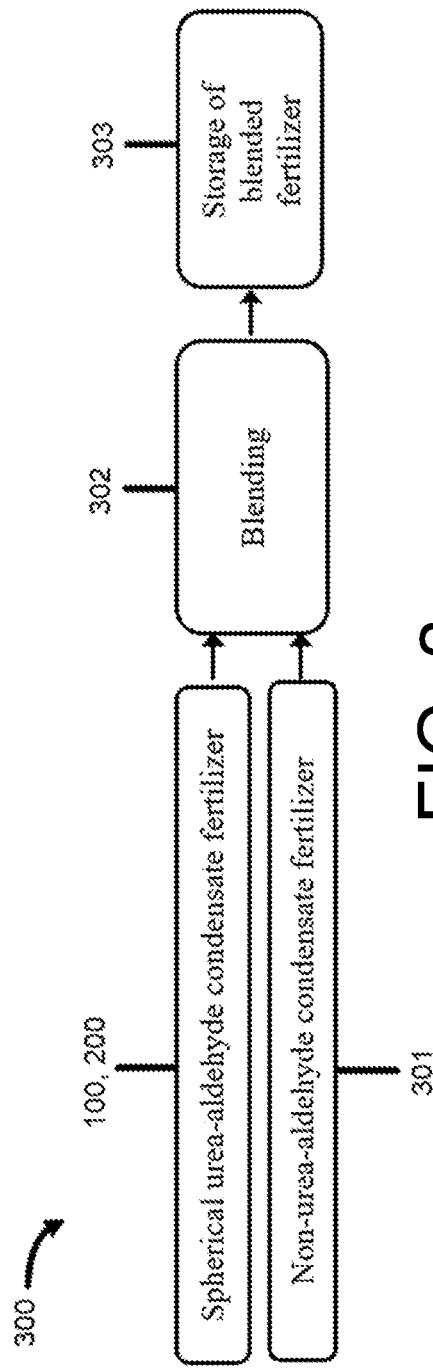
FIG. 3 depicts an embodiment of a process by which a blended fertilizer is produced.

The spherical urea-aldehyde condensate fertilizer of the present invention can also be included in a blended composition comprising other fertilizers, such as other fertilizer granules. Additional fertilizers can be chosen based on the particular needs of certain types of soil, climate, or other growing conditions to maximize the efficacy of the blended composition in enhancing plant growth and crop yield. FIG. 3 illustrates an embodiment of a process 300 by which a blended fertilizer can be produced. By way of example, spherical urea aldehyde condensate fertilizers 100, 200 of the present invention can be blended with non-spherical non-urea aldehyde condensate fertilizers 301. Blending 302 can be performed by any type of blending or mixing apparatus generally available in the art (e.g., WJ-700, WJ-900, or WJ-1000 Mixing Machines from Whirlston Machinery (Zhengzhou, China). Once blended, the fertilizer blend can be stored 303 for future use or sale.

The spherical urea-aldehyde condensate fertilizers can be blended with other fertilizer at any concentration. In some instances, the desired concentration is sufficient to meet the required nutrient or micronutrient content in the blend.

G. Method of Making a Spherical Urea-Aldehyde Condensate Fertilizer and a Blended Fertilizer In some embodiments, the spherical urea-aldehyde condensate fertilizer is made by combining a urea-aldehyde condensate and water and optionally one or more of a flow promotor, a binder, a micronutrient, and/or a combination thereof. In some instances, other suitable substances such as pH balancing agents, and other additives are also combined. The mixture can be optionally extruded. The extrudate can be formed by mixing the ingredients in dry form, adding any solvent, if needed, and further mixing to make an extrudable composition. A solvent, such as water, may be needed to make an extrudable composition. The extrusion can be done using a suitable extruder apparatus known in the art and can be performed at a temperature between 0° C. and 50° C., a screw speed from 20 to 300 rpm, a pressure of 1 bar to 50 bar, and/or wherein the extruder comprises a multi-feeder comprising extrusion components including a main drive, shaft, screw, barrel, and/or die. In some embodiments, the extrusion method comprises slicing the extrudate. The extrudate can be sliced by the use of a die or by other methods known in the art. The die can be a perforated die.

In some embodiments, the spherical urea-aldehyde condensate fertilizer is made by forming a spherical urea-aldehyde condensate fertilizer from a non-extruded combination of ingredients or from the extrudate. The spherical urea-aldehyde condensate fertilizer can have a diameter between about 1 and 4 mm. The spherical urea-aldehyde condensate fertilizer can have a substantially spherical shape. In some instances, the sphere can be formed by granulation and/or by use of a spheronizer. The granulation and/or spheronization can be performed after the chemical reactions that produce the urea-aldehyde condensate have been completed and/or after a dried fertilizer has been formed. The granulator can be any suitable granulator, such as a pan granulator or a drum granulator. The spheronizer can be any suitable spheronizer. The spheronizer can be a disc spheronizer. In some instances, the disk can have a cross-hatched chequered pattern. The spheronizer can be operated with an air pressure of 0.5 bar to 10 bar and/or a speed of 1 rpm to 5000 rpm.

The spherical urea-aldehyde condensate fertilizer can be made by use of a granulator or use of a spheronizer after granulation. The granulation can be carried out in any suitable granulator. Non-limiting examples of granulators include pan granulators or drum granulators. To make the spherical granulated urea-aldehyde condensate fertilizer, the spherical urea-aldehyde condensate fertilizer ingredients, which can include urea-aldehyde condensate and none or one or more of water, a binder, a flow promotor, or other suitable ingredients can be mixed and granulated. In some instances, granulation is carried out using powdered urea-aldehyde condensate(s) and water. The granulator can be configured to tumble and heat the ingredients in a rotating granulator under heat resulting in aggregation of the ingredients and formation of a granule. In some instances, the granulator is operated at a rotation speed of 500 RPM to 10 RPM and operated with air flow having a pressure of 0.1 bar to 10 bar and a temperature of 40° C. to 100° C. The granulation process can be performed for any amount of time, such as 1 to 15 minutes.

The granulated granule can be further processed to spheronize and/or dry, if needed. In some instances, the granules are further spheronized in a spheronizer with air flow and a spheronizer disk to produces spheres. The disk can be a patterned spheronizer disk with a chequered pattern.

Figure 2:
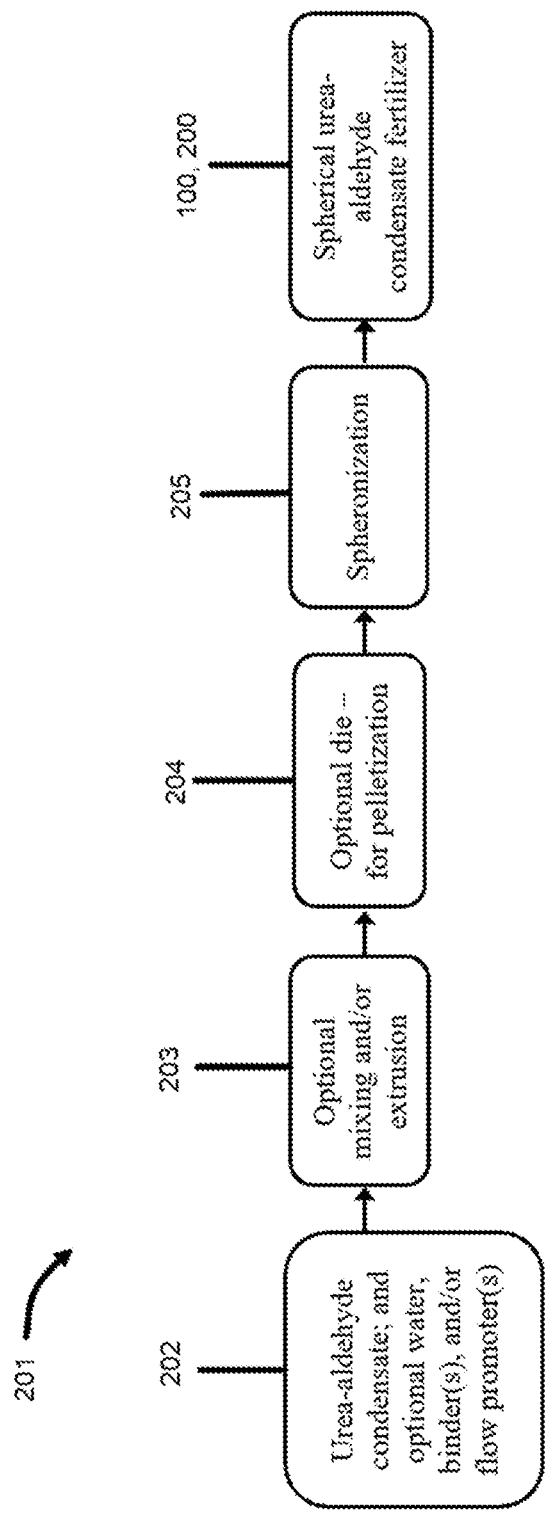
FIG. 2 depicts an embodiment of a process by which a spherical urea-aldehyde condensate fertilizer is produced.
Figure 4:
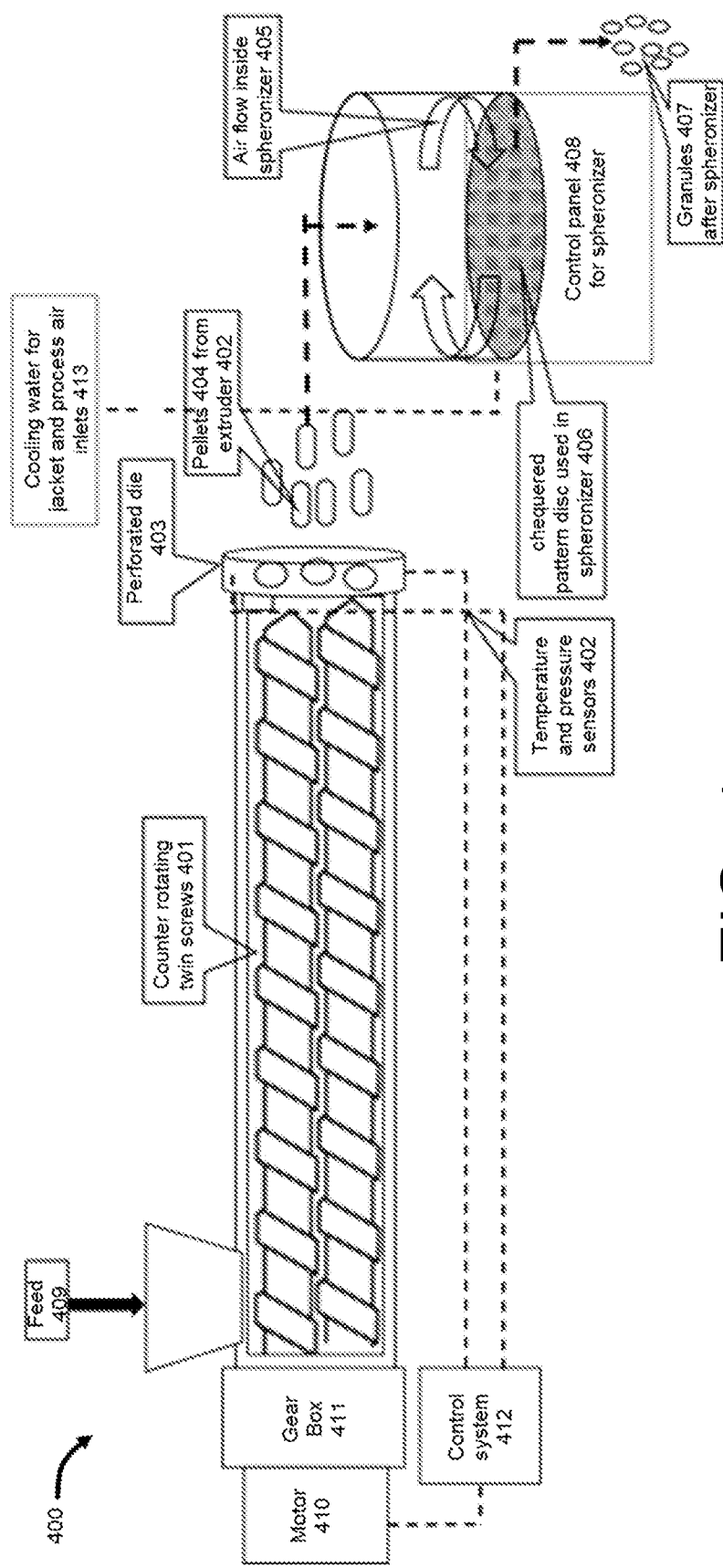
FIG. 4 depicts an embodiment of a process by which a spherical urea-aldehyde condensate fertilizer is produced.

FIG. 2 and FIG. 4 each illustrate an embodiment of a process 201 and 400, respectively, by which a spherical urea-aldehyde condensate fertilizer of the present invention can be produced. As illustrated in FIG. 2, to make the spherical urea-aldehyde condensate fertilizer 200, the spherical urea-aldehyde condensate fertilizer ingredients 202, which can include urea-aldehyde condensate and none or one or more of water, a binder, a flow promotor, or other suitable ingredients can be mixed. In some instances, the mix can be extruded 203. The extruder can be configured to push the mixed fertilizer ingredients through a die 204 in the process of extrusion and a cutting implement associated with the die cuts the extrudate into pieces, resulting in pellets, which may be further processed (not shown) to be dried, if needed. The mixed or extruded or pelletized or unmixed urea-aldehyde condensate is formed into spheres upon spheronization 205. In some instances, the spheres are formed by use of a spheronizer. As illustrated in FIG. 4, in some instances, the starting material for the urea-aldehyde condensate fertilizer can be fed into an extruder, such as a counter rotating twin screw extruder 401 that is controlled for temperature and pressure (e.g., temperature and pressure sensors 402). The ingredients can be mixed and extruded by the extruder. In some instances, the extrudate is cut by a perforated die 403 to form pellets 404. The pellets 404 can be non-spherical. In some instances, the pellets are then spheronized in a spheronizer with air flow 405 and a spheronizer disk to produces granules 407. The disk can be a patterned spheronizer disk with a chequered pattern 406. Control panel 408 can be used to operate the spheronizer. The process 400 can include feed 409 to make granules 407 and a motor 410, gear box 411, and control system 412 to operate the extruder 401. Cooling water for jacket and process air inlets 413 can be used with the spheronizer disk with a chequered pattern 406 to produce the granules 407.

After the final processing in any of the processes above, at least a majority of the spherical urea-aldehyde condensate fertilizer can be within a desired size. However, some spherical urea-aldehyde condensate fertilizer may either be over-sized or under-sized. These off-specification spherical urea-aldehyde condensate fertilizers can be separated, crushed, and the powdered material can be re-directed through the process again. In some embodiments, the recycled compositions are blended with the spherical urea-aldehyde condensate fertilizers. These compositions can comprise between 0 wt. % and 50 wt. % of the recycled compositions. However, an advantage of the claimed processes herein is that the amount of off-specification spherical urea-aldehyde condensate fertilizers can be reduced and may be completely eliminated due, in part, to the materials used and/or processing conditions used.

In some instances, a blended fertilizer is produced. FIG. 3 illustrates an embodiment of a process 300 by which a blended fertilizer can be produced. To make the blended fertilizer, the spherical urea-aldehyde condensate fertilizer of the present invention, such as 100 and/or 200, and another fertilizer 300, micronutrient, plant protection agent, filler, and/or other fertilizer ingredients can be mixed. The mixing can be performed by known processes such as blending 302, pouring mixing, vortexing, shaking, etc. In one instance, a fertilizer blending unit can be used. The fertilizer blending unit can be commercially available. In some instances, a ribbon blender can be used.

H. Methods of Using Spherical Urea-Aldehyde Condensate Fertilizers

The spherical urea-aldehyde condensate fertilizers of the present invention can be used in methods of increasing the amount of nitrogen in soil and of enhancing plant growth. Such methods can include applying to the soil an effective amount of a composition comprising the spherical urea-aldehyde condensate fertilizer of the present invention. The method may include increasing the growth and yield of the plants. The method can include applying spherical urea-aldehyde condensate fertilizers of the present invention to at least one of a soil, an organism, a liquid carrier, a liquid solvent, etc.

Non-limiting examples of plants that can benefit from the fertilizer of the present invention include vines, trees, shrubs, stalked plants, ferns, etc. The plants may include orchard crops, vines, ornamental plants, food crops, timber, and harvested plants. The plants may include any Gymnosperms, Angiosperms, and/or Pteridophytes.

The effectiveness of compositions comprising the spherical urea-aldehyde condensate fertilizers of the present invention can be ascertained by measuring the amount of nitrogen in the soil at various times after applying the fertilizer composition to one or more soils. The effectiveness of a fertilizer composition can also be directly compared to other fertilizer compositions by doing a side-by-side comparison in the same soil under the same conditions.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Methods of Making Spherical Urea-Aldehyde Condensate Fertilizers

Granulation of a methylene urea-isobutylidenediurea (MU-IBDU) fertilizer was produced by spheronizing a wet MU-IBDU mixture or first extruding the mixture and then spheronizing or granulating a wet MU-IBDU mixture.

Spheronizer—Briefly, granulation of MU-IBDU powder was carried out in a disc spheronizer (Multi Bowl Spheronizer, 250 mm, manufactured by Caleva). Dry MU-IBDU powder was moistened with 20-25% water and charged into the spheronizer. The spheronizer used a cross hatched chequered plate with a 3 mm pattern and was operated with an air pressure of 0.5 bar and a speed of 2500 rpm, for 3 to 10 min to obtain the desired granule. The MU-IBDU particles agglomerated and formed spherical granules. Not to be bound by theory, it is believed that the continuous collision of the moist material against the walls and the friction plate of the spheronizer in the presence of airflow caused the particles to be spherical. The crushing strength of granular MU-IBDU made by both methods are shown in Table 2.

Extrusion-spheronizer—Briefly, granulation of MU-IBDU was carried out using an extruder and a spheronizer. See FIG. 4. Dry MU-IBDU powder was moistened with 20-25 wt. % water and fed into an extruder. The resulting wet pellets were then spheronized using a spheronizer. The spheronizer used a cross hatched 3 mm chequered plate and was operated with an air pressure of 0.5 bar and a speed of 2500 rpm, for 5 to 10 min to obtain the desired granule. During the extrusion process, different flow promotors were also tested, such as bleached wheat flour, gaur gum, hydroxypropyl methylcellulose (HPMC), calcium ligno sulfonate, and gelatin. HPMC and gaur gum were some of the best performers. Non-limiting ratios of flow promotors range from 0.1-10 wt. %, and can be adjusted depending on the ratios of MU and IBDU present in the MU-IBDU product. In one embodiment, a mixture of MU-IBDU powder, 1 wt. % HPMC, and 20-25 wt. % water was charged into an extruder having a die hole ranging from 1.5-2.5 mm. The extruder was operated at a speed of 100 rpm and a pressure of 1-3 bar at the die point.

The MU-IBDU product can also further be enriched with other primary fertilizer elements, secondary fertilizer elements, and micro-elements using this technique.

The granules obtained by this process showed to have good physical properties. The yield obtained by this process was ~95%, with only 4-5% material loss. The spherical MU-IBDU granules, which have improved physical properties, can be used for bulk blending with other fertilizers with a reduced risk of the granules being crushed. The crushing strength of MU-IBDU extrudates that were not spheronized and dried are shown in Table 1:

TABLE 1

| Formulation (ratio) | Size | Crushing strength (kgf/granule) |
|---|---|---|
| MU-IBDU(75/25) | D = 1.6, L = 1.5 | 1.52 |
| MU-IBDU(50/50) | D = 1.5, L = 1.5 | 1.23 |

(D = diameter and L = length in mm)

The spheronizer was operated as follows: Disc speed—2500 RPM; Disc groove geometry—Cross hatched chequered plate with 3 mm pattern; Retention time—5 minutes; Air pressure—0.5 bar. The wet extrudates of MU-IBDU were immediately charged to the spheronizer and processed at the above conditions. The granules obtained from the spheronizer were dried at 80° C. for 3-4 hrs.

MU-IBDU granules with size ranging from 1.5-2.5 mm were obtained with a yield of 95%. The crushing strength of granular MU-IBDU made by both methods are shown in Table 2. The crushing strength of granular MU-IBDU was found to be improved with the combination extrusion and spheronization process.

TABLE 2

| Granulation process | Sample (ratio) | Diameter Size (mm) | Crushing strength (kgf/granule) |
|---|---|---|---|
| Spheronizer | MU-IBDU(75/25) | 1.5-2.5 | 1.4 |
| | MU-IBDU(50/50) | 1.5-2.5 | 1.4 |
| Extrusion and spheronizer | MU-IBDU(75/25) | 1.5-2.5 | 2.1 |
| | MU-IBDU(50/50) | 2.0-3.0 | 2.3 |

Granulator—Briefly, granulation of MU-IBDU powder was carried out in a pan/drum granulator using a wet process. Dry MU-IBDU powder was moistened with 10-25% water and charged into the pan/drum granulator. During continuous rotation of the pan/drum the particles agglomerated and formed granules. The granulation was conducted in a lab scale pan/drum granulator with a maximum capacity of 3 kilograms. The pan/drum contained 2 baffles, 4 and 6 inch in width across the pan/drum length. The baffles were placed at 45° angles from the center of the pan/drum.

For granulation of MU-IBDU (75:25), a mixture of MU-IBDU (75:25) powder (1 kg) and 0.5 wt. % HPMC were mixed thoroughly. 15-25 wt. % water was then added and mixed till binder dispersed uniformly. The resulting wet mass of MU-IBDU was manually fed into the pan/drum and operated under the following processing conditions.

Process parameter:
Pan/drum speed: 20 RPM
Baffle type: Plane
Retention time: 10 minutes
Air pressure: 0.5 bar
Hot air temperature: 75° C.

The granules obtained from the spheronizer were dried at 80° C. for 16 hrs. Uniform granules were obtained with size ranging from 1.5-2.5 mm with a yield of 60%.

Example 2 (Prophetic Example)

Sample Analysis

Properties of the fertilizers disclosed herein can be tested. Crush strength can be measured for some of the samples using a crush strength analyzer to determine the strength of the fertilizers.

The invention claimed is:

1. A method for producing a spherical urea-C2-C4 aldehyde condensate fertilizer granule, the granule comprising a methylene urea and isobutylidenediurea, or a methylene urea and a derivative of isobutylidenediurea, the method comprising:
    (a) combining the methylene urea and the isobutylidenediurea or derivative of isobutylidenediurea and water to form a mixture;
    (b) extruding the mixture;
    (c) forming spheres from the mixture by spheronizing with a spheronizer; and
    (d) drying the spheres to form the spherical urea-C2-C4 aldehyde condensate fertilizer granule,
    wherein the spherical urea-C2-C4 aldehyde condensate fertilizer granule has an average crush strength of greater than 1.3 kgf/granule, and wherein the ratio of methylene urea to the isobutylidenediurea or the derivative of isobutylidenediurea is 75:25 to 50:50.

2. The method of claim 1, wherein the mixture is extruded through a perforated die before forming the spheres.

3. The method of claim 1, wherein the mixture is extruded by an extruder operated at a speed of 20 rpm to 300 rpm and a pressure of 1 bar to 50 bar.

4. The method of claim 1, wherein the spheronizer is operated at a disc speed of 1500 rpm to 5000 rpm and an air flow having pressure of 0.5 bar to 10 bar.

5. The method of claim 1, wherein the spheres have an average diameter of 1 mm to 3.5 mm.

6. The method of claim 1, wherein the mixture comprises 15 wt. % to 30 wt. % water.

7. The method of claim 1, wherein the mixture further comprises one or more flow promotors, binders, or a combination thereof.

8. The method of claim 7, wherein the flow promotor is one or more of bleached wheat flour, microcrystalline silica, chitosan, natural gums, gaur gum, clays, and cellulose derivatives.

9. The method of claim 7, wherein the binder is one or more of bleached wheat flour, gaur gum, calcium ligno sulfonate, gelatin, seaweed extract, plaster of paris, flour, starch, cellulose, gluten, colloidal silica, kaolin, bentonite, poly ethylene glycol, polycaprolactone, and low molecular weight poly vinyl acetate.

10. The method of claim 1, wherein the spherical urea-C2-C4 aldehyde condensate fertilizer granule has an average crush strength of greater than 1.6 kgf/granule.

11. The method of claim 1, wherein the spherical urea-C2-C4 aldehyde condensate fertilizer granule has an average diameter of 1 mm to 3.5 mm and an average crush strength of greater than 1.6 kgf/granule.

12. The method of claim 1, wherein the spherical urea-C2-C4 aldehyde condensate fertilizer granule has an average crush strength of greater than 2.0 kgf/granule.

13. The method of claim 1, wherein the spherical urea-C2-C4 aldehyde condensate fertilizer granule comprises less than 25 wt. % urea.

* * * * *